US012651466B2

(12) United States Patent (10) Patent No.: US 12,651,466 B2
Zhang (45) Date of Patent: Jun. 9, 2026

(54) DETERMINING AN ORIENTATION OF A VEHICLE DRIVER'S HEAD

(71) Applicant: Black Sesame Technologies (Shenzhen) Co., Ltd., Shenzhen (CN)

(72) Inventor: Yanhui Zhang, Shanghai (CN)

(73) Assignee: Black Sesame Technologies (Shenzhen) Co., Ltd., Shenzhen (CN)

( * ) Notice: Subject to any disclaimer, the term of this patent is extended or adjusted under 35 U.S.C. 154(b) by 338 days.

(21) Appl. No.: 18/473,131

(22) Filed: Sep. 22, 2023

(65) Prior Publication Data

US 2024/0112474 A1 Apr. 4, 2024

(30) Foreign Application Priority Data

Sep. 28, 2022 (CN) .......................... 202211193417.5

(51) Int. Cl.
| | |
|---|---|
| *G06V 20/59* | (2022.01) |
| *G06T 7/70* | (2017.01) |
| *G06V 40/10* | (2022.01) |
| *G06V 40/20* | (2022.01) |

(52) U.S. Cl.
CPC ............. *G06V 20/597* (2022.01); *G06T 7/70* (2017.01); *G06V 40/10* (2022.01); *G06V 40/20* (2022.01); *G06T 2207/30196* (2013.01); *G06T 2207/30268* (2013.01); *G06V 2201/07* (2022.01)

(58) Field of Classification Search
CPC ...... G06V 20/597; G06V 40/10; G06V 40/20; G06V 2201/07; G06T 7/70; G06T 2207/30196; G06T 2207/30268
See application file for complete search history.

(56) References Cited

U.S. PATENT DOCUMENTS

| | | | | | |
|---|---|---|---|---|---|
| 8,687,880 | B2 * | 4/2014 | Wei | ...................... | G06V 40/171 |
| | | | | | 382/159 |
| 9,405,982 | B2 * | 8/2016 | Zhang | .................... | G06V 40/18 |
| 9,767,373 | B2 * | 9/2017 | Yang | ..................... | A61B 5/1116 |

(Continued)

FOREIGN PATENT DOCUMENTS

| | | |
|---|---|---|
| CN | 105654808 | 6/2016 |
| CN | 111591472 A | 8/2020 |
| CN | 113591762 A | 11/2021 |

OTHER PUBLICATIONS

Office Action in Chinese Appln. No. 202211193417.5, mailed on Aug. 1, 2025, 18 pages (with English translation).

(Continued)

*Primary Examiner* — Shaghayegh Azima
(74) *Attorney, Agent, or Firm* — Fish & Richardson P.C.

(57) ABSTRACT

A data processing method and system, a user state determination method and system, a storage medium, and an electronic device are provided. The data processing method includes: determining a first head posture vector of a target user, wherein the first head posture vector is a vector in a direction of a sagittal axis of a head of the target user; and determining first head orientation data of the target user based on the first head posture vector, wherein the first head orientation data includes angle data of rotation around a coronal axis of the head, and angle data of rotation around a vertical axis of the head. Data straightforwardly representing head orientation is obtained to determine a user state in an assisted driving field.

20 Claims, 5 Drawing Sheets

S200
a first head posture vector of a target user is determined

S210
first head orientation data of the target user is determined based on the first head posture vector S220
a second head posture vector of the target user is determined S2306
the first head posture vector is subtracted from the second head posture vector to obtain a head posture variation vector of the target user S2308
the head orientation variation data of the target user is determined based on the head posture variation vector

(56) References Cited

U.S. PATENT DOCUMENTS

| | | | | |
|---|---|---|---|---|
| 9,773,179 B2 * | 9/2017 | Vicente | ..................... | G06T 7/75 |
| 10,572,745 B2 | 2/2020 | Kuehnle et al. | | |
| 11,188,769 B2 * | 11/2021 | Kuehnle | ............... | G07C 5/008 |
| 2013/0251244 A1 | 9/2013 | Wei et al. | | |
| 2015/0348269 A1 * | 12/2015 | Dedhia | ................ | G06V 40/168 |
| | | | | 382/197 |
| 2016/0066782 A1 * | 3/2016 | Kimura | ................... | G06F 3/013 |
| | | | | 351/210 |
| 2016/0224852 A1 | 8/2016 | Vicente et al. | | |
| 2018/0220253 A1 * | 8/2018 | Kärkkäinen | ........... | H04R 5/033 |
| 2018/0343534 A1 * | 11/2018 | Norris | ..................... | H04S 7/303 |
| 2019/0130622 A1 * | 5/2019 | Hoover | .............. | G02B 27/0081 |
| 2019/0147262 A1 * | 5/2019 | Kuehnle | ......... | G06Q 10/06398 |
| | | | | 340/439 |
| 2019/0147263 A1 * | 5/2019 | Kuehnle | .............. | G07C 5/0866 |
| | | | | 340/439 |

OTHER PUBLICATIONS

Office Action in Chinese Appln. No. 202211193417.5, mailed on Jan. 20, 2026, 14 pages (with English translation).

* cited by examiner

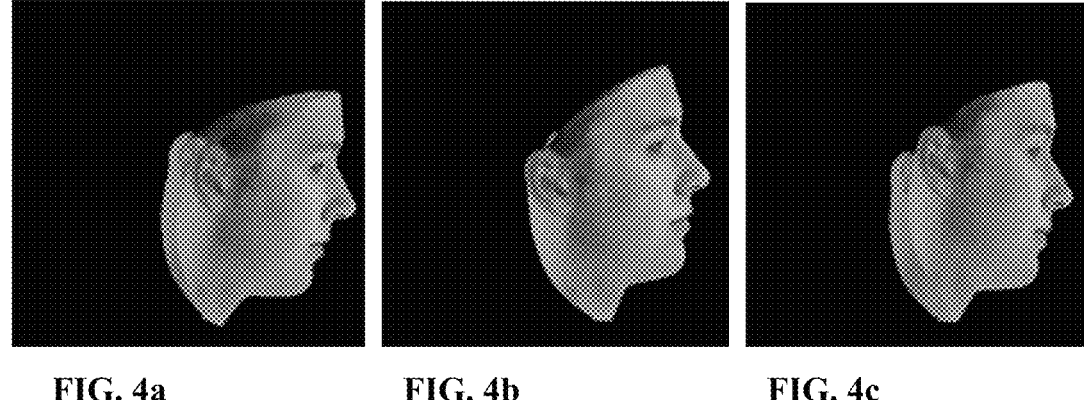

FIG. 4a          FIG. 4b          FIG. 4c

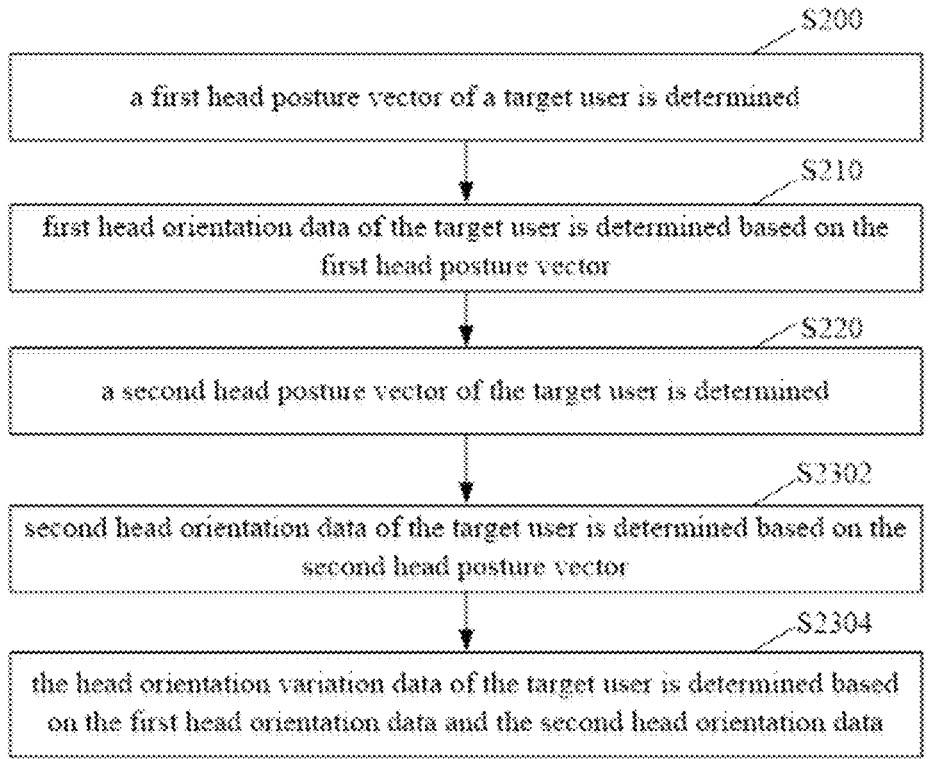

S200 a first head posture vector of a target user is determined

S210 first head orientation data of the target user is determined based on the first head posture vector

S220 a second head posture vector of the target user is determined

S2302 second head orientation data of the target user is determined based on the second head posture vector

S2304 the head orientation variation data of the target user is determined based on the first head orientation data and the second head orientation data

FIG. 5

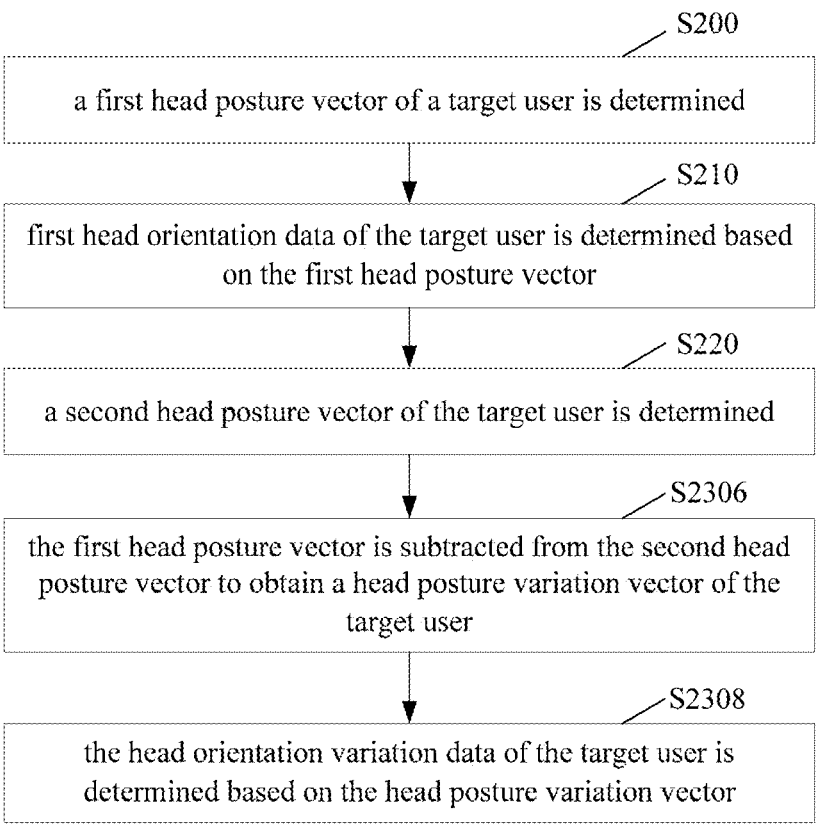

S200 a first head posture vector of a target user is determined

S210 first head orientation data of the target user is determined based on the first head posture vector

S220 a second head posture vector of the target user is determined

S2306 the first head posture vector is subtracted from the second head posture vector to obtain a head posture variation vector of the target user

S2308 the head orientation variation data of the target user is determined based on the head posture variation vector

FIG. 6

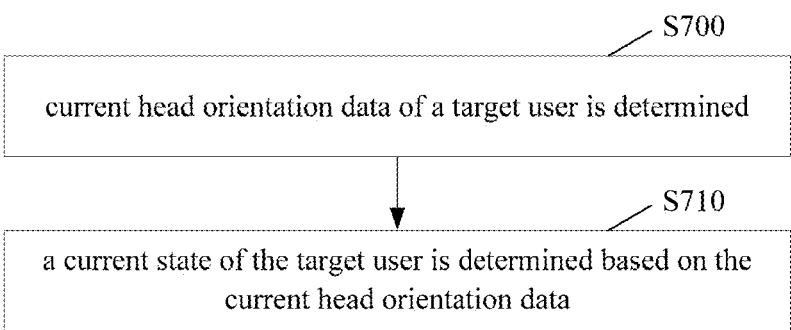

S700 current head orientation data of a target user is determined

S710 a current state of the target user is determined based on the current head orientation data

FIG. 7

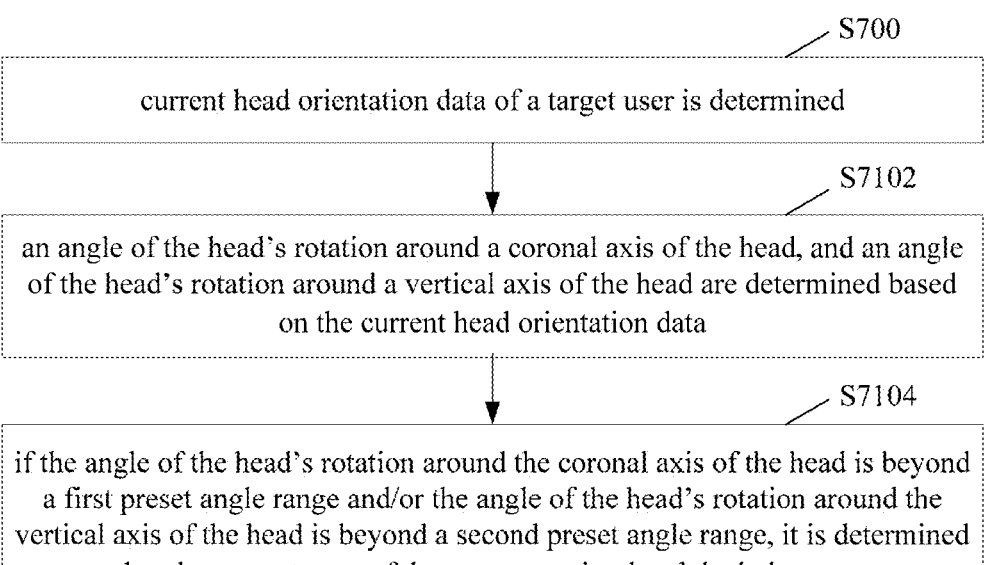

S700 current head orientation data of a target user is determined

S7102 an angle of the head's rotation around a coronal axis of the head, and an angle of the head's rotation around a vertical axis of the head are determined based on the current head orientation data

S7104 if the angle of the head's rotation around the coronal axis of the head is beyond a first preset angle range and/or the angle of the head's rotation around the vertical axis of the head is beyond a second preset angle range, it is determined that the current state of the target user is a head deviation state

FIG. 8

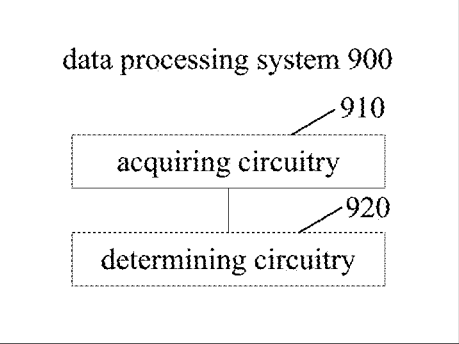

data processing system 900

910 acquiring circuitry

920 determining circuitry

FIG. 9

DETERMINING AN ORIENTATION OF A VEHICLE DRIVER'S HEAD

CROSS-REFERENCE TO RELATED APPLICATION

This application claims the benefit under 35 U.S.C. § 119(a) of the filing date of Chinese Patent Application No. 202211193417.5, filed in the Chinese Patent Office on Sep. 28, 2022. The disclosure of the foregoing application is herein incorporated by reference in its entirety.

BACKGROUND

The present disclosure relates to the assisted driving field, and, more particularly, to a data processing method and system, a user state determination method and system, a storage medium, and an electronic device.

In a conventional in-vehicle monitoring system, it is usually necessary to obtain head orientation data of a driver, so as to detect dangerous driving behaviors, such as lowering head and glancing elsewhere, based on the head orientation data, and then remind the driver to pay attention to avoid accidents.

However, current description of head orientation is generally represented by rotation matrix, Euler angle or quaternion, which is not only complex, but also difficult to accurately and straightforwardly express specific orientation information of the driver's head.

SUMMARY

The present disclosure provides a data processing method and system, and a user state determination method and system, to solve an unintuitive numerical representation problem and a gimbal deadlock problem caused by representation using Euler angles during a head orientation monitoring process in existing techniques.

In an embodiment of the present disclosure, a data processing method is provided, including: determining a first head posture vector of a target user, wherein the first head posture vector is a first vector in a direction of a sagittal axis of a head of the target user; and determining first head orientation data of the target user based on the first head posture vector, wherein the first head orientation data includes angle data of rotation around a coronal axis of the head, and angle data of rotation around a vertical axis of the head.

In some embodiments, following determining the first head orientation data of the target user based on the first head posture vector, the method further includes: determining a second head posture vector of the target user, wherein an acquisition time of the second head posture vector is later than an acquisition time of the first head posture vector, and the second head posture vector is a second vector in the direction of the sagittal axis of the head of the target user; and determining head orientation variation data of the target user based on the second head posture vector.

In some embodiments, said determining head orientation variation data of the target user based on the second head posture vector includes: determining second head orientation data of the target user based on the second head posture vector; and determining the head orientation variation data of the target user based on the first head orientation data and the second head orientation data.

In some embodiments, said determining head orientation variation data of the target user based on the second head posture vector includes: subtracting the first head posture vector from the second head posture vector to obtain a head posture variation vector of the target user; and determining the head orientation variation data of the target user based on the head posture variation vector.

In some embodiments, the first head posture vector is a unit vector.

In an embodiment of the present disclosure, a user state determination method is provided, including: determining current head orientation data of a target user, wherein the current head orientation data is determined based on the above data processing method; and determining a current state of the target user based on the current head orientation data.

In some embodiments, said determining a current state of the target user based on the current head orientation data includes: determining an angle of the head's rotation around a coronal axis of the head, and an angle of the head's rotation around a vertical axis of the head based on the current head orientation data; and if the angle of the head's rotation around the coronal axis of the head is beyond a first preset angle range and/or the angle of the head's rotation around the vertical axis of the head is beyond a second preset angle range, determining that the current state of the target user is a head deviation state.

In an embodiment of the present disclosure, a data processing system is provided, including: an acquiring circuitry configured to determine a head posture vector of a target user; and a determining circuitry configured to determine head orientation data of the target user based on the head posture vector, wherein the head posture vector is a vector in a direction of a sagittal axis of a head of the target user.

In an embodiment of the present disclosure, a user state determination system is provided, including: an orientation determining circuitry configured to determine head orientation data of a target user, wherein the head orientation data is determined based on any one of the data processing methods provided in the above embodiments; and a state determining circuitry configured to determine a current state of the target user based on the head orientation data.

In an embodiment of the present disclosure, a computer-readable storage medium having computer-executable instructions stored thereon is provided, wherein when the computer-executable instructions executed by a processor, the above data processing method or the above user state determination method is performed.

In an embodiment of the present disclosure, an electronic device is provided, including: a processor configured to perform the above data processing method or the above user state determination method; and a memory configured to store processor-executable instructions.

The data processing method provided in the embodiments of the present disclosure improves a head orientation representation method using Euler angles in the existing techniques. Specifically, in the embodiments of the present disclosure, head orientation data, i.e., an angle of rotation relative to a coordinate axis, can be directly calculated, so that a head deflection angle of the target user may be accurately and straightforwardly obtained, and further head orientation is obtained to facilitate subsequent determination of a user state. In addition, a variation degree of the head orientation data obtained through the data processing method in the embodiments of the present disclosure corresponds to a variation degree of actual head orientation, thereby avoiding a problem in the existing Euler angle representation method that a slight variation of the head orientation causes a drastic variation of values.

BRIEF DESCRIPTION OF THE DRAWINGS

FIGS. 4a to 4c are schematic diagrams of head side tilt according to an embodiment of the present disclosure;

FIG. 5 is a schematic flow chart of a data processing method according to an embodiment of the present disclosure;

FIG. 6 is a schematic flow chart of a data processing method according to an embodiment of the present disclosure;

FIG. 7 is a schematic flow chart of a user state determination method according to an embodiment of the present disclosure;

FIG. 8 is a schematic flow chart of a user state determination method according to an embodiment of the present disclosure;

FIG. 9 is a schematic structural diagram of a data processing system according to an embodiment of the present disclosure;

DETAILED DESCRIPTION OF EMBODIMENTS

Figure 1:
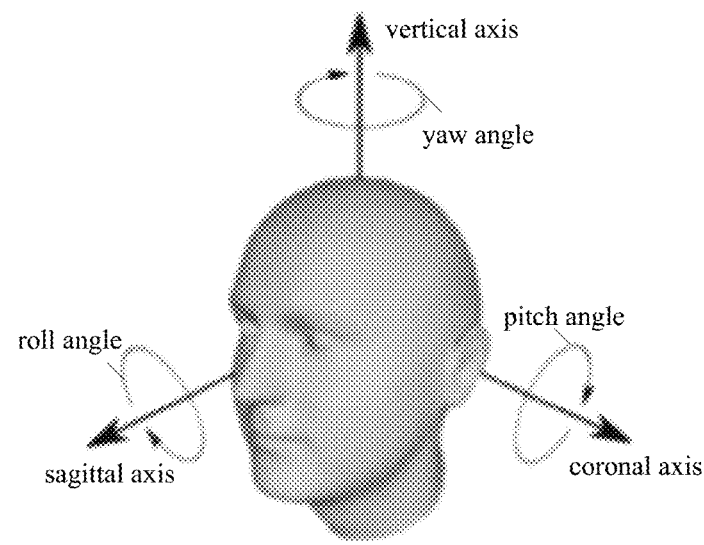
FIG. 1 is a schematic diagram of a spatial rectangular coordinate system for describing head orientation according to an embodiment of the present disclosure.

Technical solutions in the embodiments of the present disclosure will be explicitly described below in conjunction with accompanying figures in the disclosure. Obviously, the described embodiments are merely a part rather than all of embodiments of the present disclosure. Based on the embodiments provided, all other embodiments obtained by one skilled in the art without creative efforts fall within the scope of the present disclosure.

Brief Summary of the Application

Current head orientation descriptions generally use a rotation matrix, Euler angle, or an axis angle. The rotation matrix is a 3×3 orthogonal matrix, and an original position can be transformed to a target point position by multiplying the rotation matrix to the right. Therefore, head orientation of a driver can be represented accurately by the rotation matrix. However, this representation is cumbersome, as the rotation matrix has 9 elements that are not completely independent. In addition, this representation method is unintuitive, as it is difficult to quickly determine the head orientation of the driver through 9 elements. Most importantly, when a neural network is used to predict the 9 elements, a result is usually not an orthogonal matrix, and thus is inappropriate to be used for directly predicting and determining the head orientation of the driver.

The axis angle representation represents rotation of a rigid body by defining a rotation axis and an angle of rotation around the rotation axis. This method alleviates indirect representation by rotation matrix, and greatly reduces the number of parameters by using four numbers. However, this representation is unintuitive as well. The four element values of the axis angle representation are three orientations of the rotation axis and the angle of rotation. It is difficult to immediately convert the axis angle representation into the head orientation of the driver.

The Euler angle method is the most widely used method for head orientation prediction of a driver currently. To represent the orientation of a human head, rotation angles of pitch, yaw and roll based on a three-dimensional rectangular coordinate system are most commonly used at present. The pitch angle represents an angle at which the head turns up and down, the yaw angle represents an angle at which the head turns left and right, and the roll angle represents an angle at which the head rotates. That is, three angle values are used to represent the head orientation. A greatest problem of Euler angles is possibility of gimbal deadlock. For example, when the yaw angle of the head is plus or minus 90 degrees, that is, when the head is tilted 90 degrees to the left or 90 degrees to the right, there may be countless predicted angles for values of the pitch angle and the roll angle. In particular, when the yaw angle is about plus or minus 90 degrees, if the head orientation varies slightly, the values of the pitch angle and the roll angle may vary greatly, which makes it difficult to accurately obtain angle data of rotation of the head orientation.

To solve the inability to straightforwardly represent the head orientation, and the gimbal deadlock caused by the Euler angle representation method, and the problem that different Euler angle representation orders result in different Euler angle values, the embodiments of the present disclosure provide a data processing method and a user state determination method.

As the driver looks forward most of the time, and a range of rotation of a human head is limited. In the embodiments of the present disclosure, more attention is paid to the pitch angle and the yaw angle of the head of the driver, while the roll angle which represents the head orientation is less of concern than the former two. More specifically, the roll angle does not affect subsequent determination of left or right head tilt, or head up or down of the driver.

FIG. 1 is a schematic diagram of a spatial rectangular coordinate system for describing head orientation according to an embodiment of the present disclosure. As shown in FIG. 1, the coordinate axis is fixed on a head and can rotate with rotation of the head. In an embodiment, the head orientation of a target user is determined based on the coordinate axis as shown in FIG. 1. A direction pointed by a tip of a nose is a sagittal axis of the head, a direction pointed upward by a top of the head is a vertical axis of the head, and a direction perpendicular to a plane where the sagittal axis and the vertical axis are located is a coronal axis of the head. An angle of rotation around the vertical axis of the head is a yaw angle, and an angle of rotation around the coronal axis of the head is a pitch angle.

Figure 2:
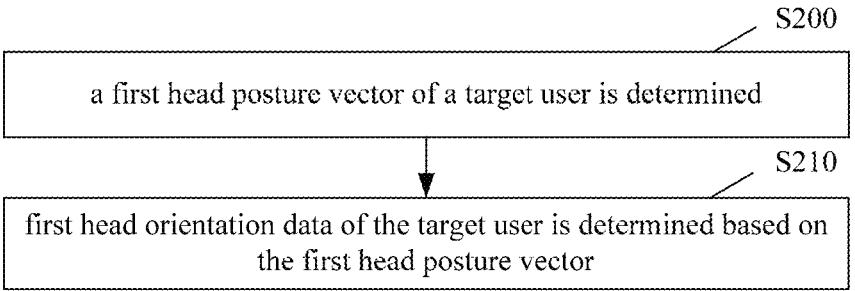
FIG. 2 is a schematic flow chart of a data processing method according to an embodiment of the present disclosure.

FIG. 2 is a schematic flow chart of a data processing method according to an embodiment of the present disclosure. As shown in FIG. 2, the data processing method in the embodiment includes following steps.

In S200, a first head posture vector of a target user is determined.

The target user may be a user whose head orientation needs to be monitored, such as a driver during driving, which is not specifically limited in the disclosure.

Specifically, the first head posture vector is a first vector in a direction of a sagittal axis of a head of the target user. To describe that head orientation by the vector in the direction of the sagittal axis of the head, only three values are needed, and calculation of the vector is faster and more straightforward than the conventional Euler angle. In some embodiments, the vector in the direction of the sagittal axis of the head is a unit vector, and its value remains between [−1, 1] after the head orientation varies, which is appropriate for prediction and representation of a neural network.

In some embodiments, the first head posture vector may be obtained through methods such as image processing or neural network learning, which is not described in detail here.

In S210, first head orientation data of the target user is determined based on the first head posture vector.

The first head orientation data includes angle data of rotation around a coronal axis of the head, and angle data of rotation around a vertical axis of the head.

In some embodiments, the angle data of rotation around the vertical axis of the head is a yaw angle in Euler angles, and the angle data of rotation around the coronal axis of the head is a pitch angle in the Euler angles. Assuming that a vector in the direction of the sagittal axis of the head of the target user be v=[a, b, c], and v is a unit vector, the head orientation data of the target user may be obtained by a transformation formula from the vector v to the yaw angle and pitch angle as follows:

$$\text{pitch} = \text{sgn } b \cdot \arccos\left(\sqrt{a^2 + c^2}\right)$$
$$\text{yaw} = \text{sgn } a \cdot \arccos\left(\sqrt{b^2 + c^2}\right).$$

With the data processing method provided in the embodiments of the present disclosure, specific angle data of the yaw angle and the pitch angle in the head orientation data can be quickly calculated, so that the current head orientation can be straightforwardly understood, which facilitates subsequent calculation and determination of a user state. In addition, the gimbal deadlock problem caused by the Euler angle representation method is avoided, that is, when the yaw angle is about 90 degrees, the value of the pitch angle may not vary drastically, and the value of the pitch angle is the only determined angle data.

Figure 3:
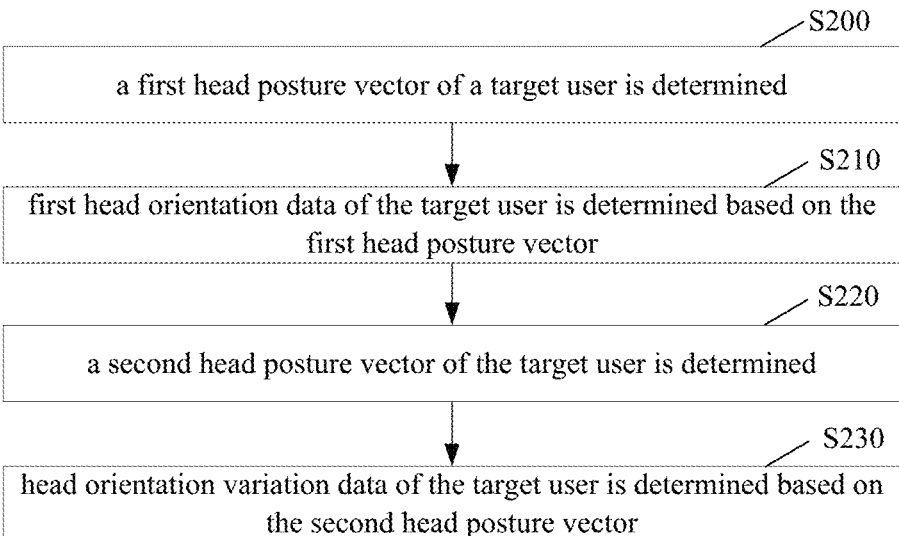
FIG. 3 is a schematic flow chart of a data processing method according to an embodiment of the present disclosure.

FIG. 3 is a schematic flow chart of a data processing method according to an embodiment of the present disclosure. The embodiment as shown in FIG. 3 is extended on the basis of the embodiment as shown in FIG. 2. A difference between the embodiment as shown in FIG. 3 and the embodiment as shown in FIG. 2 is mainly described below, and similarities therebetween are not repeated.

As shown in FIG. 3, in the embodiment, following determining the first head orientation data of the target user based on the first head posture vector, the method further includes following steps.

In S220, a second head posture vector of the target user is determined.

In some embodiments, an acquisition time of the second head posture vector is later than an acquisition time of the first head posture vector, and the second head posture vector is a second vector in the direction of the sagittal axis of the head of the target user. In addition, a way of obtaining the second head posture vector may be the same as that of the first head posture vector in the embodiment as shown in FIG. 2.

In S230, head orientation variation data of the target user is determined based on the second head posture vector.

In some embodiments, assuming that the first head posture vector is [a, b, c], and the second head posture vector is [$a_1$, $b_1$, $c_1$], by performing data processing on the first head posture vector and the second head posture vector, a head posture variation relation of the target user is obtained, and the head orientation variation data is further obtained.

Compared with conventional methods such as rotation matrix, Euler angle or quaternion, the head orientation data and the head orientation variation data obtained by the data processing method provided in the embodiment of the present disclosure may represent the head orientation more straightforwardly, and avoid the gimbal deadlock problem caused by the Euler angle representation method, and the problem of a drastic variation in the pitch angle value when the yaw angle is about 90 degrees. This is further described below in conjunction with the accompanying figures.

FIGS. 4a to 4c are schematic diagrams of head side tilt according to an embodiment of the present disclosure. Specifically, FIGS. 4a, 4b, and 4c are all image diagrams when a head turns leftward by about 90 degrees.

When the head is at a position as shown in FIG. 4a, head orientation may be represented by a rotation matrix as follows:

$$\begin{bmatrix} -0.10388201 & 0.19874255 & 0.97453064 \\ 0.05217024 & 0.9795718 & -0.19420946 \\ -0.9932204 & 0.03066663 & -0.11212834 \end{bmatrix},$$

or by a quaternion as follows:

[−0.118219346 0.11243803 0.9838755
−0.07328615], or by Euler angle as follows:

[−120.00032254879063 −83.32447096081421
117.59590432130507].

In the embodiment, when a direction of a sagittal axis of the head is used to represent the head orientation, a unit vector is:

[0.97453064 −0.19420946 −0.11212834].

Based on a transformation formula, a pitch angle and a yaw angle may be calculated as:

[−11.19853985 77.04095646].

That is, first head orientation data includes: angle data of rotation around a coronal axis of the head being 77.04095646°, and angle data of rotation around a vertical axis of the head being −11.19853985°. This straightforwardly indicates that the head orientation is turning leftward by 77.04095646° and turning downward by 11.19853985°.

When the head is at a position as shown in FIG. 4b, the head orientation may be represented by a rotation matrix as follows:

$$\begin{bmatrix} 0.09026019 & -0.03430088 & 0.99532735 \\ 0.08729474 & 0.9958326 & 0.02640206 \\ -0.99208504 & 0.08450378 & 0.09287833 \end{bmatrix},$$

or by a quaternion as follows:

[0.08948555 0.02905086 0.9937062 0.0607978], or by Euler angle as follows:

[15.868596965815636 −82.7864529047394
−20.807903374237437].

7
8

In the embodiment, when the direction of the sagittal axis of the head is used to represent the head orientation, a unit vector is:

[0.99532735 0.02640206 0.09287833].

Based on a transformation formula, a pitch angle and a yaw angle may be calculated as:

[1.51291008 84.45899958].

As stated above, the first head orientation data includes: angle data of rotation around the coronal axis of the head being 84.45899958°, and angle data of rotation around the vertical axis of the head 1.51291008°. That is, the head orientation is turning leftward by 84.45899958° and turning upward by 1.51291008°.

When the head is at a position as shown in FIG. 4*c*, the head orientation may be represented by a rotation matrix as follows:

$$\begin{bmatrix} -0.13181072 & 0.10637086 & 0.9855512 \\ -0.12570474 & 0.98440576 & -0.12305938 \\ -0.9832722 & -0.14010899 & -0.11638393 \end{bmatrix},$$

or by a quaternion as follows:

[−0.13189436 −0.00852481 0.9844118 −0.11603781], or by Euler angle as follows:

[−133.40306169990905 −79.50543660654894 141.09657453256716].

In the embodiment, when the direction of the sagittal axis of the head is used to represent the head orientation, a unit vector is:

[0.98555118 −0.12305938 −0.11638393].

Based on a transformation formula, a pitch angle and a yaw angle may be calculated as:

[−7.0687119 80.24835684].

As stated above, the first head orientation data includes: angle data of rotation around the coronal axis of the head being 80.24835684°, and angle data of rotation around the vertical axis of the head −7.0687119°. That is, the head orientation is turning leftward by 80.24835684° and turning downward by 7.0687119°.

It can be seen from comparison that when the rotation matrix and the quaternion are used to represent the head orientation, actual orientation cannot be seen straightforwardly. When the Euler angle is used to represent the orientation, although the orientations in FIGS. 4*a*, 4*b* and 4*c* are not much different, but representation of Euler angles is quite different numerically. When the head orientation is represented by the direction of the sagittal axis of the head, the angle of rotation around the coronal axis of the head and the angle of rotation around the vertical axis of the head can be easily calculated according to the unit vector in the direction of the sagittal axis of the head, and an actual deflection angle can be known straightforwardly, thereby avoiding a drastic variation in the value caused by a gimbal when using the Euler angle to represent the orientation.

FIG. 5 is a schematic flow chart of a data processing method according to an embodiment of the present disclosure. The embodiment as shown in FIG. 5 is extended on the basis of the embodiment as shown in FIG. 3. A difference between the embodiment as shown in FIG. 5 and the embodiment as shown in FIG. 3 is mainly described below in conjunction with the data obtained by FIG. 4, and similarities therebetween are not repeated.

As shown in FIG. 5, in the embodiment of the present disclosure, said determining the head orientation variation data of the target user based on the second head posture vector includes following steps.

In S2302, second head orientation data of the target user is determined based on the second head posture vector.

In some embodiments, assuming that the second head posture vector of the target user, i.e., the vector in the direction of the sagittal axis of the head, is $v_1=[a_1, b_1, c_1]$, angle data of rotation around the coronal axis of the head and angle data of rotation around the vertical axis of the head that are corresponding to the second head posture vector are calculated by the method in S210 as shown in FIG. 2.

In S2304, the head orientation variation data of the target user is determined based on the first head orientation data and the second head orientation data.

In some embodiments, taking FIG. 4*a*'s illustration as the first head orientation, and FIG. 4*b*'s illustration as the second head orientation, the first head orientation data corresponding to the first head orientation is [−11.19853985 77.04095646], and the second head orientation data corresponding to the second head orientation is [1.51291008 84.45899958]. A variation angle of the head orientation of the target user is determined by subtracting corresponding first head orientation data from the angle data of rotation around the coronal axis of the head and the angle data of rotation around the vertical axis of the head in the second head orientation data. That is, the head of the target user turns upward by 12.7114499° and turns leftward by 7.4180431°.

The variation of the head orientation of the target user can be analyzed through the variation angle of the head orientation, which is convenient for predicting the head orientation and monitoring the head posture of the target user.

FIG. 6 is a schematic flow chart of a data processing method according to an embodiment of the present disclosure. The embodiment as shown in FIG. 6 is extended on the basis of the embodiment as shown in FIG. 3. A difference between the embodiment as shown in FIG. 6 and the embodiment as shown in FIG. 3 is mainly described below, and similarities therebetween are not repeated.

As shown in FIG. 6, in the embodiment of the present disclosure, said determining the head orientation variation data of the target user based on the second head posture vector includes following steps.

In S2306, the first head posture vector is subtracted from the second head posture vector to obtain a head posture variation vector of the target user.

In some embodiments, assuming that the first head posture vector is $v=[a, b, c]$, and the first head posture vector is $v_1=[a_1, b_1, c_1]$, the first head posture vector is subtracted from the second head posture vector to obtain the head posture variation vector $[a_1-a, b_1-b, c_1-c]$ of the target user.

In S2308, the head orientation variation data of the target user is determined based on the head posture variation vector.

Specifically, head orientation variation of the target user may be directly represented by the head posture variation vector. Both the first head posture vector and the second head posture vector are unit vectors that are quite suitable for training and prediction of a neural network. In addition, when there is a slight variation in the head orientation of the target user, the head posture variation vector can also accurately represent the variation of the head orientation.

In some embodiments of the present disclosure, after the head orientation data and the head orientation variation data are determined, a state of the target user may be determined based on the head orientation data and the head orientation variation data. A user state determination method provided by the present disclosure is described below in conjunction with the accompanying figures.

FIG. 7 is a schematic flow chart of a user state determination method according to an embodiment of the present disclosure. As shown in FIG. 7, the user state determination method in the embodiment includes following steps.

In S700, current head orientation data of a target user is determined.

In some embodiments, the current head orientation data, including an angle of the head's rotation around a coronal axis of the head, and an angle of the head's rotation around a vertical axis of the head based on the current head orientation data, is determined based on the data processing method provided in any one of the above embodiments.

In S710, a current state of the target user is determined based on the current head orientation data.

In some embodiments, a rotation angle of the head of the target user is determined based on the angle of the head's rotation around the coronal axis of the head, and the angle of the head's rotation around the vertical axis of the head, so as to determine the current head orientation of the target user, i.e., the current state of the target user.

In the embodiment, the state of the user is determined by using the angle of the head's rotation around the coronal axis of the head, and the angle of the head's rotation around the vertical axis of the head, thus, a result can be obtained straightforwardly without complicated formula conversion or reasoning.

FIG. 8 is a schematic flow chart of a user state determination method according to an embodiment of the present disclosure. The embodiment as shown in FIG. 8 is extended on the basis of the embodiment as shown in FIG. 7. A difference between the embodiment as shown in FIG. 8 and the embodiment as shown in FIG. 7 is mainly described below in conjunction with the data obtained by FIG. 4, and similarities therebetween are not repeated.

As shown in FIG. 8, in the embodiment, said determining a current state of the target user based on the current head orientation data includes following steps.

In S7102, an angle of the head's rotation around a coronal axis of the head, and an angle of the head's rotation around a vertical axis of the head are determined based on the current head orientation data.

In some embodiments, taking the data obtained in FIG. 4*a* as an example, the angle data of rotation around the coronal axis is −11.19853985°, and the angle data of rotation around the vertical axis is 77.04095646°.

In S7104, if the angle of the head's rotation around the coronal axis of the head is beyond a first preset angle range and/or the angle of the head's rotation around the vertical axis of the head is beyond a second preset angle range, it is determined that the current state of the target user is a head deviation state.

In some embodiments, taking the data obtained in FIG. 4*a* as an example. Assuming that the first preset angle range is [−60°, 60°], and the second preset angle range is [−15°, 15°]. As in FIG. 4*a*, the angle data of rotation around the coronal axis of the head is 77.04095646° which is beyond the first preset angle range, and the angle data of rotation around the vertical axis of the head is −11.19853985° which is within the second preset angle range, thus, it is determined that the current state of the target user is a head deviation state.

In some embodiments, the first preset angle range and the second preset angle range include preset angle values, which can be determined through various methods, such as experiments, to achieve functions of monitoring and reminding the head orientation of the target user, and are not limited here. The method provided in the embodiment may flexibly, accurately and timely monitor the head orientation of the target user.

FIG. 9 is a schematic structural diagram of a data processing system according to an embodiment of the present disclosure. As shown in FIG. 9, the data processing system 900 in the embodiment includes an acquiring circuitry 910 and a determining circuitry 920. Specifically, the acquiring circuitry 910 is configured to obtain a first head posture vector of a target user. The determining circuitry 902 is configured to determine first head orientation data of the target user based on the first head posture vector, wherein the first head orientation data includes angle data of rotation around a coronal axis of the head, and angle data of rotation around a vertical axis of the head.

In some embodiments, the acquiring circuitry 910 is further configured to obtain a second head posture vector of the target user, wherein an acquisition time of the second head posture vector is later than an acquisition time of the first head posture vector, and the second head posture vector is a second vector in the direction of the sagittal axis of the head of the target user.

In some embodiments, the determining circuitry 920 is further configured to determine head orientation variation data of the target user based on the second head posture vector.

In some embodiments, the determining circuitry 920 is further configured to determine second head orientation data of the target user based on the second head posture vector; and determine the head orientation variation data of the target user based on the first head orientation data and the second head orientation data.

In some embodiments, the determining circuitry 920 is further configured to subtract the first head posture vector from the second head posture vector to obtain a head posture variation vector of the target user; and determine the head orientation variation data of the target user based on the head posture variation vector.

In some embodiments, the first head posture vector is a unit vector.

Figure 10:
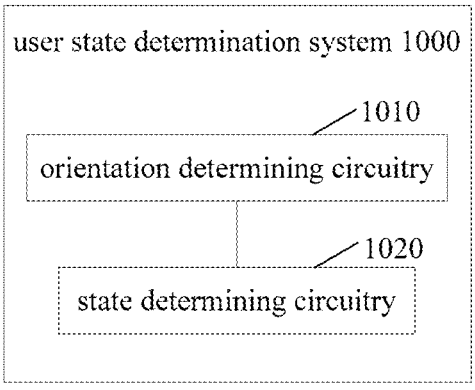
FIG. 10 is a schematic structural diagram of a user state determination system according to an embodiment of the present disclosure.

FIG. 10 is a schematic structural diagram of a user state determination system according to an embodiment of the present disclosure. As shown in FIG. 10, the user state determination system 1000 provided in the embodiment includes an orientation determining circuitry 1010 and a state determining circuitry 1020. Specifically, the orientation determining circuitry 1010 is configured to determine head orientation data of a target user, wherein the head orientation vector is determined based on the data processing method provided in any one of the above-mentioned embodiments. The state determining circuitry 1020 is configured to determine a current state of the target user based on the head orientation data.

In some embodiments, the state determining circuitry 1020 is further configured to: determine an angle of the head's rotation around a coronal axis of the head, and an angle of the head's rotation around a vertical axis of the head based on the current head orientation data; and if the angle of the head's rotation around the coronal axis of the head is beyond a first preset angle range and/or the angle of the head's rotation around the vertical axis of the head is beyond a second preset angle range, determine that the current state of the target user is a head deviation state.

Figure 11:
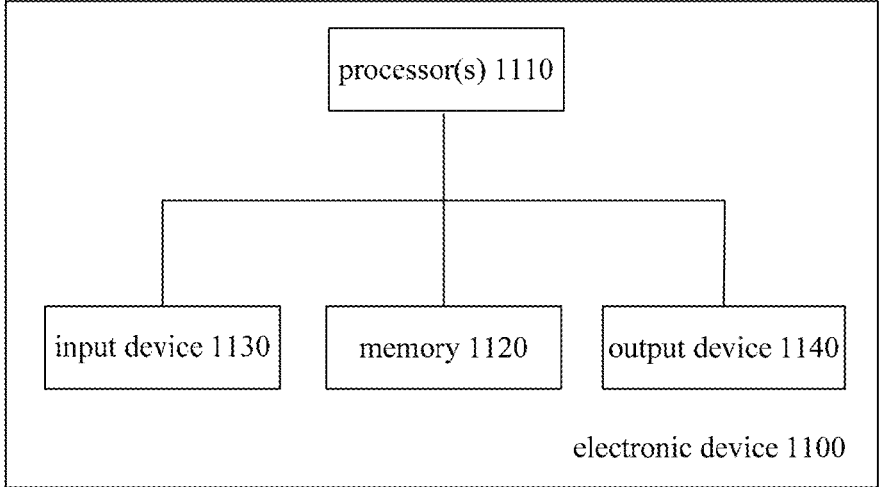
FIG. 11 is a schematic structural diagram of an electronic device according to an embodiment of the present disclosure.

FIG. 11 is a schematic structural diagram of an electronic device according to an embodiment of the present disclosure. As shown in FIG. 11, the electronic device 1100 includes one or more processors 1110 and a memory 1120.

The processor 1110 may be a Central Processing Unit (CPU) or a processing unit in other forms which has data processing capability and/or instruction execution capability, and may control other components in the electronic device 1100 to perform desired functions.

The memory 1120 may include one or more computer program products which may include various forms of computer-readable storage media, such as volatile memory and/or nonvolatile memory. The volatile memory may include, for example, a Random Access Memory (RAM) and/or a cache. The nonvolatile memory may include, for example, a Read Only Memory (ROM), a hard disk, a flash memory, and the like. One or more computer program instructions can be stored on the computer-readable storage medium, and the processor 1110 may execute the program instructions to implement the data processing method and the user state determination method provided in the various embodiments of the present disclosure as described above method and/or other desired functions. Various content such as current head orientation data may also be stored in the computer-readable storage medium.

In some embodiments, the electronic device 1100 may further include an input device 1130 and an output device 1140, and these components are interconnected through a bus system and/or other forms of connection mechanisms (not shown).

The input device 1130 may include, for example, a keyboard, a mouse, and the like.

The output device 1140 may output various information to the outside, including the first head orientation data of the target user and the like. The output device 1140 may include, for example, a display, a speaker, a printer, a communication network and remote output devices connected thereto, and the like.

For sake of simplicity, only some of components relevant with the present disclosure in the electronic device 1100 are shown in FIG. 11, and components such as bus or input/output interface are omitted. In addition, according to specific application conditions, the electronic device 1100 may further include any other appropriate components.

Besides the above methods and systems, embodiments of the present disclosure may be a computer program product which includes computer program instructions that, when executed by a processor, cause the processor to perform the above-described steps in the data processing method and the user state determination method provided in various embodiments of the present disclosure.

The computer program product can write, in any combination of one or more programming languages, program codes for operations of the embodiments of the present disclosure. The programming languages include object-oriented programming languages, such as Java or C++, or include conventional procedural programming languages, such as the "C" language or similar programming languages. The program codes may be executed entirely on a user's computing device, partly on the user's computing device, as a stand-alone software package, partly on the user's computing device and partly on a remote computing device, or entirely on the remote computing device or on a server.

Basic principles of the present disclosure have been described above in conjunction with specific embodiments, but it should be noted that advantages, advantages, effects, etc. mentioned in the present disclosure are merely examples but not limitations, and these advantages, effects, etc. cannot be considered as necessary for each embodiment of the present disclosure. In addition, specific details disclosed above are merely for a purpose of illustration and understanding rather than limitation, but do not limit the present disclosure.

The block diagrams of devices, apparatuses, equipment and systems involved in the present disclosure are merely illustrative examples and are not intended to require or imply that they must be connected, arranged, and configured in a manner as shown in the block diagrams. As will be appreciated by those skilled in the art, these components, apparatuses, devices, systems may be connected, arranged, configured in any manner. Words such as "including", "comprising", "having" and the like are open-ended words which means "including but not limited to", and may be used interchangeably therewith. As used herein, the words "or" and "and" refer to the word "and/or", and may be used interchangeably therewith, unless the context explicitly indicates otherwise. As used herein, the word "such as" refers to a phrase "such as but not limited to", and may be used interchangeably therewith.

It should also be noted that in the devices, equipment and methods of the present disclosure, each component or each step can be decomposed and/or reassembled. These decompositions and/or re-combinations should be considered equivalents of the present disclosure.

The above descriptions of the disclosed aspects are provided to enable any one skilled in the art to make or use the present disclosure. Various modifications to these aspects are readily apparent to those skilled in the art, and generic principles defined herein may be applied to other aspects without departing from the scope of the present disclosure. Therefore, the present disclosure is not intended to be limited to the aspects shown herein, but is in accordance with the widest scope consistent with the principles and features disclosed herein.

The above is only preferred embodiments of the present disclosure, and is not intended to limit the present disclosure. Any modifications or equivalent replacements, etc. made within the spirit and principles of the present disclosure shall fall within the scope of the present disclosure.

The invention claimed is:

1. A data processing method, comprising:
determining a first head posture vector of a target user, wherein the first head posture vector is a first vector in a direction of a sagittal axis of a head of the target user; and
determining first head orientation data of the target user based on data consisting of the first head posture vector, wherein the first head orientation data comprises angle data of rotation around a coronal axis of the head, and angle data of rotation around a vertical axis of the head.

2. The method according to claim 1, wherein after determining the first head orientation data of the target user based on the data consisting of the first head posture vector, the method further comprises:
determining a second head posture vector of the target user, wherein an acquisition time of the second head posture vector is later than an acquisition time of the first head posture vector, and the second head posture vector is a second vector in the direction of the sagittal axis of the head of the target user; and
determining head orientation variation data of the target user based on the second head posture vector.

3. The method according to claim 2, wherein determining the head orientation variation data of the target user based on the second head posture vector comprises:

determining second head orientation data of the target user based on the second head posture vector; and determining the head orientation variation data of the target user based on the first head orientation data and the second head orientation data.

4. The method according to claim 2, wherein determining the head orientation variation data of the target user based on the second head posture vector comprises:

subtracting the first head posture vector from the second head posture vector to obtain a head posture variation vector of the target user; and determining the head orientation variation data of the target user based on the head posture variation vector.

5. The method according to claim 4, further comprising:

determining a current state of the target user based on the head orientation variation data.

6. The method according to claim 5, wherein determining the current state of the target user based on the head orientation variation data comprises:

determining an angle of a head's rotation around a coronal axis of the head, and an angle of the head's rotation around a vertical axis of the head based on the head orientation variation data; and in response to determining that the angle of the head's rotation around the coronal axis of the head is beyond a first preset angle range and/or the angle of the head's rotation around the vertical axis of the head is beyond a second preset angle range, determining that the current state of the target user is a head deviation state.

7. One or more non-transitory computer readable storage media comprising computer-executable instructions stored thereon that, when executed by a processor, cause the processor to perform operations comprising:

determining a first head posture vector of a target user, wherein the first head posture vector is a first vector in a direction of a sagittal axis of a head of the target user; and determining first head orientation data of the target user based on data consisting of the first head posture vector, wherein the first head orientation data comprises angle data of rotation around a coronal axis of the head, and angle data of rotation around a vertical axis of the head.

8. An electronic device, comprising:

one or more processors; and a memory for storing processor-executable instructions;

wherein the one or more processors is configured to perform operations comprising:

determining a first head posture vector of a target user, wherein the first head posture vector is a first vector in a direction of a sagittal axis of a head of the target user; and determining first head orientation data of the target user based on data consisting of the first head posture vector, wherein the first head orientation data comprises angle data of rotation around a coronal axis of the head, and angle data of rotation around a vertical axis of the head.

9. The electronic device according to claim 8, wherein the operations further comprise:

determining a second head posture vector of the target user, wherein an acquisition time of the second head posture vector is later than an acquisition time of the first head posture vector, and the second head posture vector is a second vector in the direction of the sagittal axis of the head of the target user; and determining head orientation variation data of the target user based on the second head posture vector.

10. The electronic device according to claim 9, wherein determining the head orientation variation data of the target user based on the second head posture vector comprises:

determining second head orientation data of the target user based on the second head posture vector; and determining the head orientation variation data of the target user based on the first head orientation data and the second head orientation data.

11. The electronic device according to claim 9, wherein determining the head orientation variation data of the target user based on the second head posture vector comprises:

subtracting the first head posture vector from the second head posture vector to obtain a head posture variation vector of the target user; and determining the head orientation variation data of the target user based on the head posture variation vector.

12. The electronic device according to claim 11, wherein the operations further comprise:

determining a current state of the target user based on the head orientation variation data.

13. The electronic device according to claim 12, wherein determining the current state of the target user based on the head orientation variation data comprises:

determining an angle of a head's rotation around a coronal axis of the head, and an angle of the head's rotation around a vertical axis of the head based on the head orientation variation data; and in response to determining that the angle of the head's rotation around the coronal axis of the head is beyond a first preset angle range and/or the angle of the head's rotation around the vertical axis of the head is beyond a second preset angle range, determining that the current state of the target user is a head deviation state.

14. The electronic device according to claim 8, comprises:

an acquiring circuitry configured to determine the first head posture vector of the target user; and a determining circuitry configured to determine the first head orientation data of the target user based on the first head posture vector.

15. The electronic device according to claim 14, further comprises:

another circuitry configured to determine a current state of the target user based on the first head orientation data.

16. The one or more computer readable storage media according to claim 7, wherein the operations further comprise:

determining a second head posture vector of the target user, wherein an acquisition time of the second head posture vector is later than an acquisition time of the first head posture vector, and the second head posture vector is a second vector in the direction of the sagittal axis of the head of the target user; and determining head orientation variation data of the target user based on the second head posture vector.

17. The one or more computer readable storage media according to claim 16, wherein determining the head orientation variation data of the target user based on the second head posture vector comprises:

determining second head orientation data of the target user based on the second head posture vector; and determining the head orientation variation data of the target user based on the first head orientation data and the second head orientation data.

18. The one or more computer readable storage media according to claim 16, wherein determining the head orientation variation data of the target user based on the second head posture vector comprises:

subtracting the first head posture vector from the second head posture vector to obtain a head posture variation vector of the target user; and determining the head orientation variation data of the target user based on the head posture variation vector.

19. The one or more computer readable storage media according to claim 18, wherein the operations further comprise:

determining a current state of the target user based on the head orientation variation data.

20. The one or more computer readable storage media according to claim 19, wherein determining the current state of the target user based on the head orientation variation data comprises:

determining an angle of a head's rotation around a coronal axis of the head, and an angle of the head's rotation around a vertical axis of the head based on the head orientation variation data; and in response to determining that the angle of the head's rotation around the coronal axis of the head is beyond a first preset angle range and/or the angle of the head's rotation around the vertical axis of the head is beyond a second preset angle range, determining that the current state of the target user is a head deviation state.

\* \* \* \* \*